United States Patent [19]

Juri et al.

[11] Patent Number: 5,481,309
[45] Date of Patent: Jan. 2, 1996

[54] VIDEO SIGNAL BIT RATE REDUCTION APPARATUS HAVING ADAPTIVE QUANTIZATION

[75] Inventors: Tatsuro Juri, Osaka; Masakazu Nishino, Kashiwara, both of Japan

[73] Assignee: Matsushita Electric Industrial Co., Ltd., Osaka, Japan

[21] Appl. No.: 74,484

[22] Filed: Jun. 11, 1993

[30] Foreign Application Priority Data

Jun. 15, 1992 [JP] Japan .................... 4-154650

[51] Int. Cl.$^6$ .................................................. H04N 7/30
[52] U.S. Cl. .................... 348/405; 348/404; 348/390
[58] Field of Search .................... 358/133, 136; 348/405, 414, 417–418, 419, 384, 390, 403, 404; H04N 7/133

[56] References Cited

U.S. PATENT DOCUMENTS

| | | | |
|---|---|---|---|
| 4,780,761 | 10/1988 | Daly et al. | 358/133 |
| 4,908,862 | 3/1990 | Kaneko | 348/409 |
| 5,150,208 | 9/1992 | Otaka et al. | 348/420 |
| 5,237,410 | 8/1993 | Inoue | 358/136 |
| 5,241,401 | 8/1993 | Fujiwara et al. | 358/133 |
| 5,321,440 | 6/1994 | Yanagihara et al. | 348/408 |

FOREIGN PATENT DOCUMENTS

| | | | |
|---|---|---|---|
| 0387051 | 9/1990 | European Pat. Off. | H04N 7/133 |
| 0435163 | 6/1991 | European Pat. Off. | G06F 15/64 |
| 0466475 | 1/1992 | European Pat. Off. | H04N 7/133 |
| 3940554 | 6/1990 | Germany | H04N 1/415 |

OTHER PUBLICATIONS

Patent Abstracts of Japan, vol. 13, No. 570 (P-977) 18 Dec. 1989 & JP-A∞01 237 774 (Konica Corp) 22 Sep. 1989.
"Motion Video Adaptive Quantization in the Transform Domain", CA Gonzeles, E. Viscito, IEEE, 1991.

Primary Examiner—Tommy P. Chin
Assistant Examiner—Vu Le
Attorney, Agent, or Firm—Wenderoth, Lind & Ponack

[57] ABSTRACT

When quantizing the components transformed in each block, the transformed components in the block are classified into plural sets, and the quantizing width is determined in each classification, and when quantizing with a large quantizing width, the quantizing width of the transformed component belonging to the set of the transformed components less important visually is set larger.

10 Claims, 10 Drawing Sheets

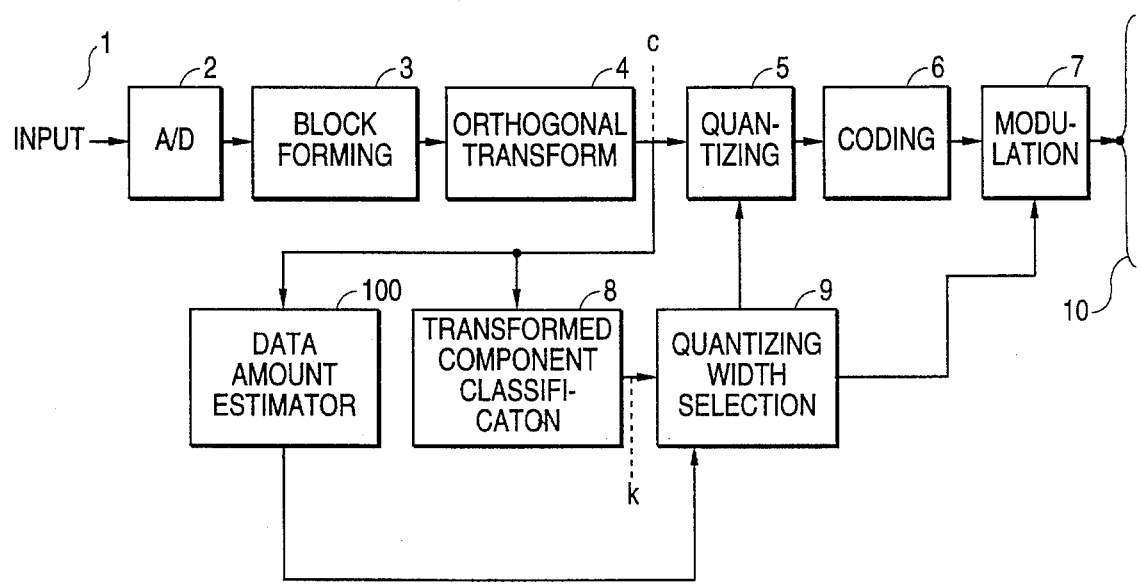

FIG. 3

| n | TRANSFORMED COMPONENT CLASSIFICATION (k) | | | | |
|---|---|---|---|---|---|
| | 0 | 1 | 2 | 3 | 4 |
| 15 | 1 | 1 | 1 | 1 | 1 |
| 14 | 1 | $\sqrt{2}$ | $\sqrt{2}$ | $\sqrt{2}$ | $\sqrt{2}$ |
| 13 | 1 | $\sqrt{2}$ | $\sqrt{2}$ | 2 | 2 |
| 12 | $\sqrt{2}$ | $\sqrt{2}$ | 2 | 2 | $2\sqrt{2}$ |
| 11 | 2 | 2 | 2 | $2\sqrt{2}$ | 4 |
| 10 | 2 | $2\sqrt{2}$ | $2\sqrt{2}$ | 4 | 4 |
| 9 | $2\sqrt{2}$ | $2\sqrt{2}$ | 4 | 4 | $4\sqrt{2}$ |
| 8 | $2\sqrt{2}$ | 4 | $4\sqrt{2}$ | $4\sqrt{2}$ | $4\sqrt{2}$ |
| 7 | 4 | 4 | $4\sqrt{2}$ | 8 | 8 |
| 6 | 4 | $4\sqrt{2}$ | $4\sqrt{2}$ | 8 | $8\sqrt{2}$ |
| 5 | 4 | $4\sqrt{2}$ | 8 | $8\sqrt{2}$ | $8\sqrt{2}$ |
| 4 | $4\sqrt{2}$ | $4\sqrt{2}$ | 8 | $8\sqrt{2}$ | 16 |
| 3 | $4\sqrt{2}$ | $4\sqrt{2}$ | $8\sqrt{2}$ | 16 | $16\sqrt{2}$ |
| 2 | $4\sqrt{2}$ | 8 | $8\sqrt{2}$ | 16 | $16\sqrt{2}$ |
| 1 | 8 | 8 | 16 | $16\sqrt{2}$ | 32 |
| 0 | 8 | $8\sqrt{2}$ | 16 | $16\sqrt{2}$ | 32 |

FIG. 6

| BLOCK CLASSIFICATION (j) | | | TRANSFORMED COMPONENT CLASSIFICATION (k) | | | | |
|---|---|---|---|---|---|---|---|
| 0 | 1 | 2 | 0 | 1 | 2 | 3 | 4 |
| 15 |   |   | 1 | 1 | 1 | 1 | 1 |
| 14 |   |   | 1 | 1 | 1 | 1 | 1 |
| 13 | 15 |   | 1 | 1 | 1 | 1 | 1 |
| 12 | 14 |   | 1 | 1 | 1 | 1 | 1 |
| 11 | 13 | 15 | 1 | 1 | 1 | 1 | 1 |
| 10 | 12 | 14 | 1 | $\sqrt{2}$ | $\sqrt{2}$ | $\sqrt{2}$ | $\sqrt{2}$ |
| 9 | 11 | 13 | 1 | $\sqrt{2}$ | $\sqrt{2}$ | 2 | 2 |
| 8 | 10 | 12 | $\sqrt{2}$ | $\sqrt{2}$ | 2 | 2 | $2\sqrt{2}$ |
| 7 | 9 | 11 | 2 | 2 | 2 | $2\sqrt{2}$ | 4 |
| 6 | 8 | 10 | 2 | $2\sqrt{2}$ | $2\sqrt{2}$ | 4 | 4 |
| 5 | 7 | 9 | $2\sqrt{2}$ | $2\sqrt{2}$ | 4 | 4 | $4\sqrt{2}$ |
| 4 | 6 | 8 | $2\sqrt{2}$ | 4 | $4\sqrt{2}$ | $4\sqrt{2}$ | $4\sqrt{2}$ |
| 3 | 5 | 7 | 4 | 4 | $4\sqrt{2}$ | 8 | 8 |
| 2 | 4 | 6 | 4 | $4\sqrt{2}$ | $4\sqrt{2}$ | 8 | $8\sqrt{2}$ |
| 1 | 3 | 5 | 4 | $4\sqrt{2}$ | 8 | $8\sqrt{2}$ | $8\sqrt{2}$ |
| 0 | 2 | 4 | $4\sqrt{2}$ | $4\sqrt{2}$ | 8 | $8\sqrt{2}$ | 16 |
|   | 1 | 3 | $4\sqrt{2}$ | $4\sqrt{2}$ | $8\sqrt{2}$ | 16 | $16\sqrt{2}$ |
|   | 0 | 2 | $4\sqrt{2}$ | 8 | $8\sqrt{2}$ | 16 | $16\sqrt{2}$ |
|   |   | 1 | 8 | 8 | 16 | $16\sqrt{2}$ | 32 |
|   |   | 0 | 8 | $8\sqrt{2}$ | 16 | $16\sqrt{2}$ | 32 |

| i | OFFSET VALUE |
|---|---|
| 0 | 0 |
| 1 | 0 |
| 2 | 1 |
| 3 | 2 |
| 4 | 2 |

0
VIDEO SIGNAL BIT RATE REDUCTION APPARATUS HAVING ADAPTIVE QUANTIZATION

BACKGROUND OF THE INVENTION

1. Title of the Invention

The present invention relates to a bit rate reduction apparatus for reducing the data amount of video information.

2. Description of the Prior Art

To reduce the data amount when transmitting or recording video information, bit rate reduction is often employed. Bit rate reduction is a means for compressing the data amount by removing the redundant portion of the video information. In a conventional example of bit rate reduction, the input sample value is first divided into blocks of adjacent plural sample values, and each block is orthogonally transformed to be coded in each orthogonal transform. In the bit rate reduction making use of such transformations, the transformed component is quantized, and is transmitted by variable length coding.

The variable length coding is a method of coding a signal having a high frequency of occurrence into a code word of a small number of bits, and coding a signal having a low frequency or occurrence into a code word of a large number of bits. As a result, data can be transmitted by a smaller number of bits in average. Therefore, in the conventional apparatus for recording or transmitting video information, the data is once curtailed by variable length coding, and then recorded or reproduced.

In such variable length coding, usually, the data amount after variable length coding may differ depending on the input video information. Accordingly, to keep constant the data amount after variable length coding, the data amount is controlled by a process called quantization prior to variable length coding. Quantization is a process of dividing an input transform component by a certain value to transform the same into a smaller value. This divisor is called the quantizing width. When the quantizing width is small, the data is transformed into a lager value by quantization (the compression rate is small), or when the quantizing width is large, the data is transformed into a smaller value by quantization (the compression rate is large). Therefore, by changing the quantizing width adaptively depending on the input data, the data amount after variable length coding may be kept constant.

Such an adaptive quantizing means is disclosed in U.S. patent application Ser. No. 07/741047, "Orthogonal transform coding apparatus", filed Aug. 6, 1991. In this patent, first, transformed components in each block after orthogonal transform are classified into plural sets. Then, in every classified set, one quantizing width is selected from plural quantizing widths, and quantization is executed. By thus selecting the quantizing width in each set, a combination of multiple quantizations may be possible in the block units if the variety of quantizing widths is small. Therefore, minute data amount control is possible in a small circuit (few quantizing widths).

SUMMARY OF THE INVENTION

The prior art relates to a method of quantizing for realizing minute data amount control in a small circuit scale. By quantizing, however, the picture quality deteriorates due to quantizing distortion (the error between the original signal and the reproduced signal due to quantizing and inverse quantizing). This gives rise to the necessity of a quantizing method for improving such picture quality deterioration. It is hence a primary object of the invention to solve the problems of the conventional bit rate reduction apparatus.

It is a first aspect of the invention to provide a bit rate reduction apparatus comprising block forming means for dividing input samples of a video signal into blocks each composed of a specific number of samples, transforming means for transforming the samples in each block to obtain transformed components in each block, transformed component classifying means for classifying the transformed components in each block into k sets of classes (k is an integer larger than 1) according to visual importance of each of the transformed components and for outputting a classification signal indicating which class each of the transformed components is classified, quantizing width selecting means having m kinds of quantizing widths (m is an integer larger than 1) and being responsive to the classification signal for selecting a quantizing width, quantizing means for quantizing each of the transformed components according to a quantizing width selected by the quantizing width selecting means, and encoding means for encoding an output of the quantizing means to obtain bit rate reduction coded data. The quantizing width selecting means composes n quantizing groups (n is an integer larger than 1) each being composed of k sets of quantizing widths assigned to correspond to the k sets of classes such that the n quantizing groups are arranged in an order having such a general tendency that the assigned quantizing widths increase, that a quantizing width assigned to a class of smaller visual importance becomes relatively larger than a quantizing width assigned to a class of larger visual importance and that a difference between the quantizing width assigned to the class of smaller visual importance and the quantizing width assigned to the class of larger visual importance increases.

With this constitution, as the quantizing width becomes larger (i.e., as the compression rate becomes higher), the quantizing width assigned to a transformed component which is smaller in visual importance becomes larger than the quantizing width assigned to a transformed component which is larger in visual importance and the difference between the two quantizing widths increases. Accordingly, when the compression rate becomes higher and the quantizing distortion becomes larger, the quantizing distortion will be concentrated on the transformed components which are small in visual importance. Hence, an image of high quality with reduced degradation can be obtained even when the compression rate is raised.

It is a second aspect of the invention to provide a bit rate reduction apparatus comprising block forming means for dividing input samples of a video signal into blocks each composed of a specific number of samples, transforming means for transforming the samples in each block to obtain transformed components in each block, block classifying means for classifying the blocks of transformed components into j sets of classes (j is an integer larger than 1) according to a sum of absolute values of the transformed components in each block and for outputting a block classification signal indicating a class of each block, transformed component classifying means for classifying the transformed components in each block into k sets of classes (k is an integer larger than 1) and for outputting a transformed component classification signal indicating a class of each transformed component, quantizing width selecting means having a plurality of quantizing widths and being responsive to the block classification signal and the transformed component classification signal for selecting one of the plurality of quantizing widths. quantizing means for quantizing each of the transformed components according to a quantizing width selected by the quantizing width selecting means, and encoding means for encoding an output of the quantizing means to obtain bit rate reduction coded data. The quantizing width selecting means selects a quantizing width such that the transformed components in a block classified into a class larger in the sum of the absolute values of the transformed components are given larger quantizing widths than those given to the transformed components in a block classified into a class smaller in the sum of the absolute values of the transformed components.

With this constitution, the visual importance, or whether the distortion in a block would be easily sensed by human eye, is determined by the sum of absolute values of the transformed components in the block. The quantizing width given to a transformed component is determined according to a class of the block in which the transformed component is contained such that the quantizing distortion will be concentrated on a block having a larger sum of absolute values of the transformed components. Since the image distortions are concentrated on blocks which are visually less important, the quality of the whole picture can be improved.

It is a third aspect of the invention to provide a bit rate reduction apparatus comprising block forming means for dividing input samples of a video signal into blocks each composed of a specific number of samples, transforming means for transforming the samples in each block to obtain transformed components in each block, transformed component classifying means for classifying the transformed components in each block into k sets of classes (k is an integer larger than 1) and for outputting a classification signal indicating which class each of the transformed components is classified, quantizing width selecting means having m kinds of quantizing widths (m is an integer larger than 1) and being responsive to the classification signal for selecting a quantizing width, quantizing means for quantizing each of the transformed components according to a quantizing width selected by the quantizing width selecting means, encoding means for encoding an output of the quantizing means to obtain bit rate reduction coded data, and data amount estimating means for estimating a data amount of bit rate reduction coded data and outputting a data amount control signal indicating an estimated data amount. The quantizing width selecting means composes n quantizing groups (n is an integer larger than 1) each being composed of k sets of quantizing widths assigned to correspond to the k sets of classes and is responsive to the data amount control signal for selecting one of the n quantizing groups such that the amount of the bit rate reduction coded data is more minutely controlled as the quantizing width becomes larger.

With this constitution, as the quantizing width becomes larger, the variation of the bit rate reduction coded data amount caused due to the change of the quantizing width decreases. Accordingly, when the compression rate is high and thus image quality degradation is caused, the data amount can be controlled more minutely, so that it is possible to minimize the image quality degradation. Further, when the block classification is employed, it is possible to avoid the block distortion which would otherwise be caused by concentration of quantizing distortion on a particular block.

It is a fourth aspect of the invention to provide a bit rate reduction apparatus comprising block forming means for dividing input samples of a video signal into blocks each composed of a specific number of samples, transforming means for transforming the samples in each block to obtain transformed components each being expressed as c, quantizing width selecting means for selecting a quantizing width from a plurality of quantizing widths each being expressed as $2^i$ or $2^{(i+\frac{1}{2})}$, where t is an integer including 0, offset value generating means for generating an offset value determined by a value of i, quantizing means for quantizing each of the transformed components by using the quantizing width selected by the quantizing width selecting means and the offset value to obtain a quantized value, and encoding means for encoding the quantized value to obtain a bit rate reduction coded data. The quantizing means shifts a value of (c+the offset value) by 1 bits when the quantizing width is $2^i$ and shifts a value of $\{(c \times 45+32)/64+\text{the offset value}\}$ by i bits when the quantizing width is $2^{(i+\frac{1}{2})}$ to obtain the quantized value.

With this constitution, every quantizing width is expressed as a power of 2 or a product of a power of 2 and $\sqrt{2}$. In quantization using such quantizing width, the part of the power of 2 can be realized by a binary bit shift. The part of $\sqrt{2}$ can be realized by a calculation of $\{(45 \times a+32)/64\}$, where a is an input transformed component value. Accordingly, a quantizer may be constituted to serially execute the process for the part of the power of 2 and the process for the part of $\sqrt{2}$. Further, this quantizer can be changed to an inverse quantizer by merely replacing the process for the part of $\sqrt{2}$ with a calculation of $\{(45 \times b+16)/32\}$, where b is an input quantized value.

It is a fifth aspect of the invention to provide a bit rate reduction apparatus comprising block forming means for dividing input samples of a video signal into blocks each composed of a specific number of samples, transforming means for transforming the samples in each block to obtain transformed components each being expressed as c, quantizing width generating means for generating a quantizing width expressed as $w \times 2^i$ where w is a positive integer and i is an integer including 0, offset value generating means for generating an offset value which is a maximum integer value not larger than both $(2^i-1)/2$ and a predetermined value t, quantizing means for quantizing each of the transformed components by using the quantizing width and the offset value to obtain a quantized value, and encoding means for encoding the quantized value to obtain a bit rate reduction coded data. The quantizing means shifts a value of (c/w+ the offset value) by i bits to obtain the quantized value.

With this constitution, the offset value used in quantization is controlled to be not larger than the predetermined value t. With this control, the offset value is limited when the quantizing width is large. Accordingly, the quantized value obtained by using a large quantizing width becomes further smaller. When the components which are smaller in visual importance are given with larger quantizing widths in the manner as described in the first aspect of the invention, the data amount for the visually less important information can be further reduced.

It is a sixth aspect of the invention to provide a bit rate reduction apparatus comprising block forming means for dividing input samples of a video signal into blocks each composed of a specific number of samples, transforming means for transforming the samples in each block to obtain transformed components each being expressed as c, quantizing width selecting means having m kinds of quantizing widths (m is an integer larger than 1) including a power of 2 or a product of a power of 2 and one of 3, 5, ⅓ and ⅕ and for selecting one quantizing width, quantizing means for quantizing each of the transformed components by using the selected quantizing width to obtain a quantized value, and encoding means for encoding the quantized value to obtain a bit rate reduction coded data.

With this constitution, since the quantizing with used for quantization can be selected from a power of 2 or a product of a power of 2 and one of 3, 5, ⅓ and ⅕, more accurate quantization and data amount control are possible.

BRIEF DESCRIPTION OF THE DRAWINGS

FIG. 1 is a block diagram of a first embodiment of a bit rate reduction apparatus of the invention.

FIG. 2 is an explanatory diagram of a transformed components classification of the invention.

FIG. 3 is a table of quantizing widths of the invention.

FIG. 6 is a table of quantizing widths of the invention.

DESCRIPTION OF THE PREFERRED EMBODIMENTS

Figure 4:
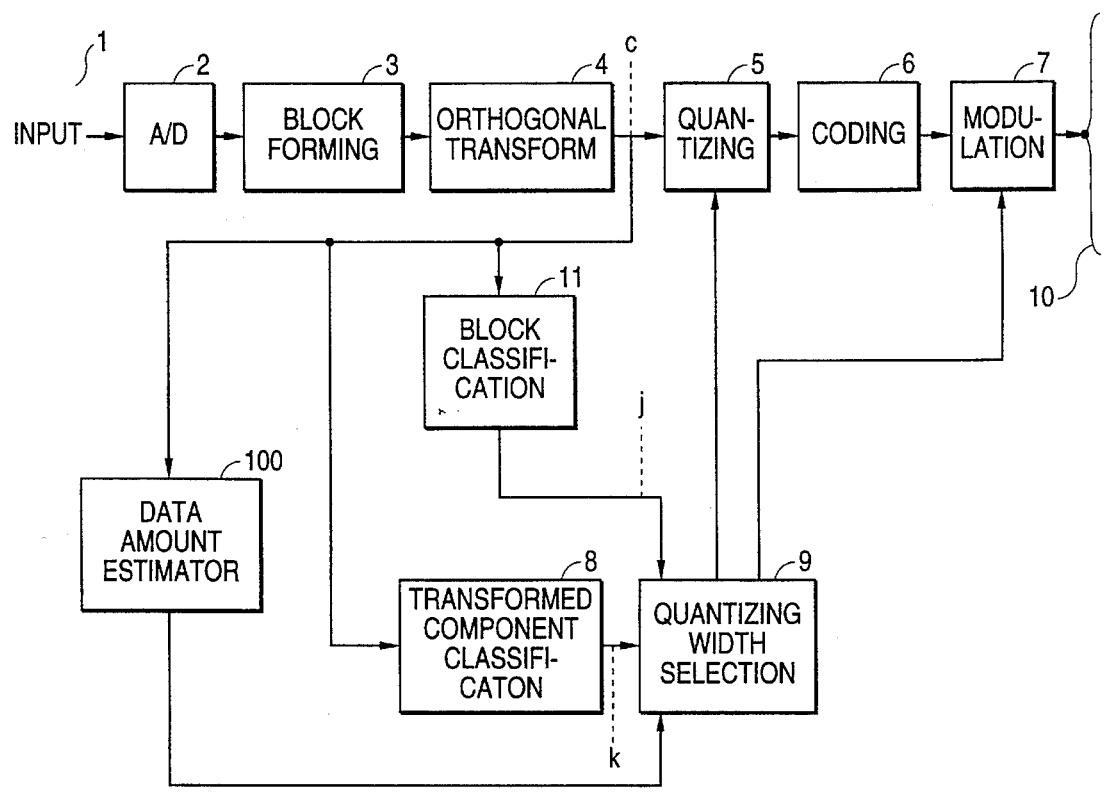
FIG. 4 is a block diagram of a second embodiment of a bit rate reduction apparatus of the invention.

The invention is described below by reference to some of its preferred embodiments. A bit rate reduction apparatus according to the first embodiment of the invention is described while referring to FIG. 1.

In FIG. 1, reference number 1 denotes an input part for receiving a video signal. 2 is an A/D converter, 3 is a block forming part, 4 is an orthogonal transformer, 5 is a quantizer, 6 is an encoder, 7 is a modulator, 8 is a transformed component classifying part, 9 is a quantizing width selector, and 10 is a magnetic tape.

The video signal entering from the input part 1 is converted into a sample value by the A/D converter 2. This sample value is divided into blocks in every plural sample values by the block forming part 3. The sample value formed into blocks by the block forming part 3 is orthogonally transformed in every block by the orthogonal transformer 4 to becomes transformed components (c). On the other hand, in the transformed component classifying part 8, the transformed components c produced from the orthogonal transformer 4 are classified according to visual importance. In the quantizing width selector 9, the quantizing width is determined on the basis of the manner in which the transformed components to be quantized have been classified by the transformed component classifying part 8. In the quantizer 5, using the quantizing width selected in the quantizing width selector 9, the transformed component is quantized, and the obtained quantized value q is entered into the encoder 6. In the encoder 6, the quantized value q is processed by variable length coding, and is fed into the modulator 7. At the same time, the combination of the quantizing width appalled in the quantizer (the quantizing group) is also fed into the modulator 7. These data are transformed into bit rows suited to magnetic recording in the modulator 7, and recorded on the magnetic tape 10. A data amount estimator 100 estimates, from the output of the orthogonal transformer 4, the amount of coded data resulted from the bit rate reduction, and feeds a data amount estimation signal indicating the estimated data amount to the quantizing width selector 9. The quantizing width selector 9 is, in one aspect, responsive to the data amount estimation signal for selecting an appropriate quantizing width so as to control the amount of bit rate reduction coded data within a specific range in the known manner.

By such actions, the quantizing width can be changed between the transformed components important visually and the transformed components less important. Therefore, by widening the quantizing width of the transformed components less important visually and concentrating the quantizing distortion in that transformed component, the visual deterioration of image quality can be decreased.

A practical example of the transformed component classifying part 8 in the embodiment in FIG. 1 is explained below. In block forming in the embodiment in FIG. 1, one block is composed of 64 sample values in total consisting of horizontal 8 pixels and vertical 8 lines. The orthogonal transformer 4 generates 64 two-dimensional transformed components from these 64 sample values by two-dimensional orthogonal transformation.

FIG. 2 shows 64 two-dimensional transformed components c. In FIG. 2, the transformed components expressing low band in both horizontal direction and vertical direction are disposed in the upper left corner, and the transformed components are arranged in the sequence of frequency from the lowest one, so that the transformed components expressing high band in the horizontal direction may come to the right side, while the transformed components expressing high band in the vertical direction may be located to the lower side. The numerals in FIG. 2 represent the number (k) of each classified set of transformed components. However, the direction current component (DC) is included in the region of number 0. As shown in FIG. 2, the transformed component of the smaller number means the set of transformed components for lower frequency. The human vision is sensitive to low frequency and insensitive to high frequency. Therefore, the visual image quality can be improved by assigning the larger quantizing width for the set of the greater classified number (the higher frequency). Locally, meanwhile, the transformed component of low frequency may be sometimes classified in the set of the greater number.

The table in FIG. 3 is a practical example of a combination of the quantizing widths of the quantizer 5 used in the embodiment in FIG. 1. The leftmost row columns in the table in FIG. 3 denotes the quantizing group numbers, and in this example, 16 (n=16) quantizing groups are used. The right side columns represent the quantizing widths corresponding to the number of the sets of classified transformed components shown in FIG. 2. in FIG. 3, 16 quantizing groups are composed of 5 (k=5) sets of transformed components and 11 (m=11) quantizing widths. In the quantizing width selector 9 in FIG. 1, in every block, one quantizing group is selected from 16 quantizing blocks by the known method according to the data amount estimation signal supplied from the data amount estimator 100, and the quantization is executed by the quantizer 5 according to this quantizing width. As a result, the information as to what quantization has been executed in each block is regenerated at the reproducing side by transmitting the quantizing group number in FIG. 3.

In the embodiment in FIG. 1, the variable length coding is executed in the encoder 6, but the data amount after variable length coding varies significantly depending on the input sample value. Accordingly, the quantization is controlled in order to keep constant the transmission data amount. In quantizing in FIG. 3, the quantizing width is larger in the quantizing group having the smaller quantizing group number. Hence, to reduce the data amount (to raise the compression rate), the quantizing group of the smaller number is selected, or to increase the data amount (to lower the compression rate), the quantizing group of the larger number is selected.

Having such a constitution, in this embodiment, as the quantizing width becomes larger (the compression rate becomes higher), the quantizing width for the transformed component lower in visual importance is relatively larger than the quantizing width for the transformed component higher in visual importance. Therefore, when the compression rate becomes larger and the quantizing distortion increases, the quantizing distortion can be concentrated in the transformed component low in visual importance. Hence, when the compression rate is raised, the visual deterioration of image quality can be decreased.

In the table in FIG. 3, incidentally, in the quantizing group of the smaller quantizing group number (larger quantizing width), the ratio of the quantizing widths is large between the classified sets having the small number and the large number. To the contrary, in the quantizing group of the larger quantizing group number (smaller quantizing width), the ratio of the quantizing widths is small between the classified sets having the small number and the large number. Hence, in the quantizing group large in the quantizing width and obvious in the quantizing distortion, it is possible to concentrate the quantizing distortion in the transformed component low in visual importance. Therefore, the image quality deterioration can be decreased also when the quantizing width is large and the compression rate is high.

As practical values of the invention such as quantizing width, combination of quantizing widths, and composition of classification of transformed components, in an actual apparatus, various constitutions other than those shown in FIG. 2 and FIG. 3 may be also applied.

A second embodiment of the invention is described below by referring to FIG. 4. In FIG. 4, numeral i denotes an input part for receiving a video signal, 2 is an A/D converter, 3 is a block forming part, 4 is an orthogonal transformer, 5 is a quantizer, 6 is an encoder, 7 is a modulator, 8 is a transformed component classifying part, 9 is a quantizing width selector, 10 is a magnetic tape, and 11 is a block classifying part.

The video signal entering through the input part 1 is converted into a sample value in the A/D converter 2. This sample value is divided into blocks in every plural sample values in the block forming part 3. The sample values formed into blocks by the block forming part 3 are orthogonally transformed in every block by the orthogonal transformer 4 to be transformed components. In the block classifying part 11, on the other hand, every block is judged as to whether the distortion of the block is easily recognized visually, and is classified into three sets. The set with the visually obvious distortion is number 0, the set with the next obvious distortion is number 1, and the set with less obvious distortion is number 2.

In the transformed component classifying part 8, the transformed components produced from the orthogonal transformer 4 are classified according to the visual importance. In the quantizing width selector 9, the quantizing width is determined on the basis of the manner in which the blocks are to be quantized, or the manner in which the transformed components have been classified by the block classifying part 11 and transformed component classifying part 8. Also, the same way as the embodiment shown in FIG. 1, the data amount estimator 100 produces the data amount estimation signal indicative of the estimated amount of bit rate reduction coded data. The data amount indicated by the data amount estimation signal from the data amount estimator 100 is also considered by the quantifying width selector q in determination of the quantizing group n so as to control the amount of bit rate reduction coded data within a specific range in the known manner. In the quantizer 5, using the quantizing width selected by the quantizing width selector 9, the transformed components are quantized, and quantized values q are obtained and fed into the encoder 6. In the encoder 6, the quantized values q are processed by variable length coding, and are modulated in the modulator 7, and recorded in the magnetic tape 10. The selected quantizing group number n and the classification number j selected by the block classifying part 11 are also recorded at the same time.

Figure 5:
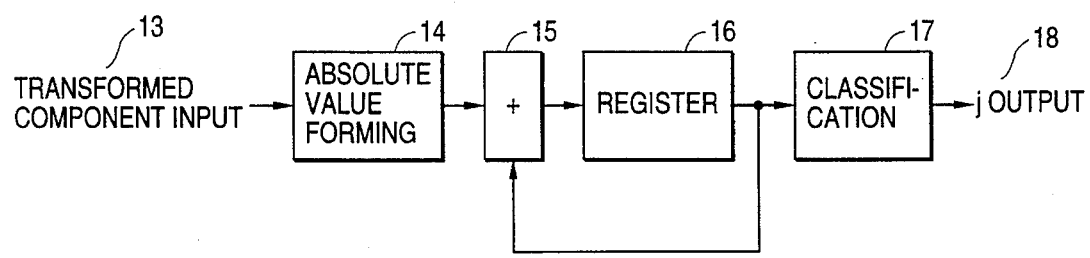
FIG. 5 is a block diagram of an embodiment of a block classification of the invention.

In the embodiment in FIG. 4, every block is classified aside from the processing in the embodiment in FIG. 1. A practical constitution of block classification is shown in FIG. 5. In FIG. 5, numeral 13 is a transformed component input part, 14 is an absolute value forming part, 15 is an adder, 16 is a register, 17 is a classifying part, and 18 is a j output part.

The transformed component centering from the transformed component input part 13 in FIG. 5 is changed into an absolute value in the absolute value forming part 14, and is fed into the adder 15. In the adder 15, the sum of the absolute value of the transformed component at the present time produced from the absolute value forming part 14, and the absolute value of the transformed component in the same block before the present time produced from the register 16 is calculated, and fed into the register 16. In this way, the sum of the absolute values of transformed components in every block is stored in the register 16. At the initial time of each block (the time when the DC component is fed), however, the content of the register 16 is reset to zero. On the basis of the total sum of the absolute values of the transformed components in one block produced from the register 16, it is detected in the classifying part 7 to which set the block belongs, and the set number j is produced to the output part 18.

When the sum of the absolute values of transformed components is small, the dynamic range of the sample values in the block is small, and quantizing distortion is likely to be detected. On the other hand, when the sum of the absolute values of transformed components is large, the dynamic range of the sample values in the block is large, and quantizing distortion is less likely to be detected. Therefore, the block small in the sum of the absolute values is classified in the set of the smaller number.

In the transformed component classifying part 8, as in the first embodiment (FIG. 2), the transformed components are classified by the visual importance.

FIG. 6 shows a table of quantizing widths for this embodiment. The table in FIG. 6 also comprises 16 quantizing groups. What is different from the table in FIG. 3 is that the quantizing width varies depending on the number (j) of the sets obtained by the block classification, even in the same quantizing group number (the numbers from 0 to 15 at the left side of the table in FIG. 6). Accordingly, the block in which the image quality deterioration is likely to be detected (the block small in the set number by block classification), the smaller quantizing width is assigned even in the same quantizing group number. Therefore, the quantizing distortion can be concentrated in the block in which the visual deterioration is less obvious, so that the image quality deterioration can be improved on the whole.

The block classifying means in the invention may be realized by various methods, such as the use of the DC component values in the block, aside from the method explained in FIG. 5. In the second embodiment, by finding the sum of the absolute values of the transformed components in the block, it is classified by Judging If the distortion of the block is easily detected visually or not. By varying the quantizing width in every classified set, the quantizing distortion may be concentrated in the block with the greater sum of the absolute values of the transformed components. Thus, by concentrating the distortion of the image information of one screen into the block less obvious in distortion, the entire image quality can be improved.

A third embodiment of the invention is described below. In the third embodiment, the foregoing first and second embodiments may be directly applied. The features of the third embodiment are explained by using the table of the quantizing widths in FIG. 3. In the table in FIG. 3, as the quantizing group number n (the number expressed from 0 to 15 at the leftmost side in FIG. 3) becomes smaller, the quantizing width becomes larger. That is, the compression rate is higher when handling the quantizing group with the smaller quantizing group number. In the table in FIG. 3, moreover, it is designed so that the change of the data amount after coding due to a difference in the quantizing group number by one becomes smaller as the quantizing group number becomes smaller. This is explained by reference to FIG. 7. The axis of abscissas in FIG. 7 denotes the quantizing group number n, while the axis of ordinates expresses the data amount per block after variable length coding. It is understood from FIG. 7 that the change of the data amount becomes smaller as the quantizing group number becomes smaller (the compression rate becomes higher). By thus setting the quantizing width, it is possible to execute the data amount control more minutely in the state of the high compression in which the image quality deterioration is more likely to be detected. Hence, the image quality deterioration when the compression rate is high can be minimized.

Figure 7:
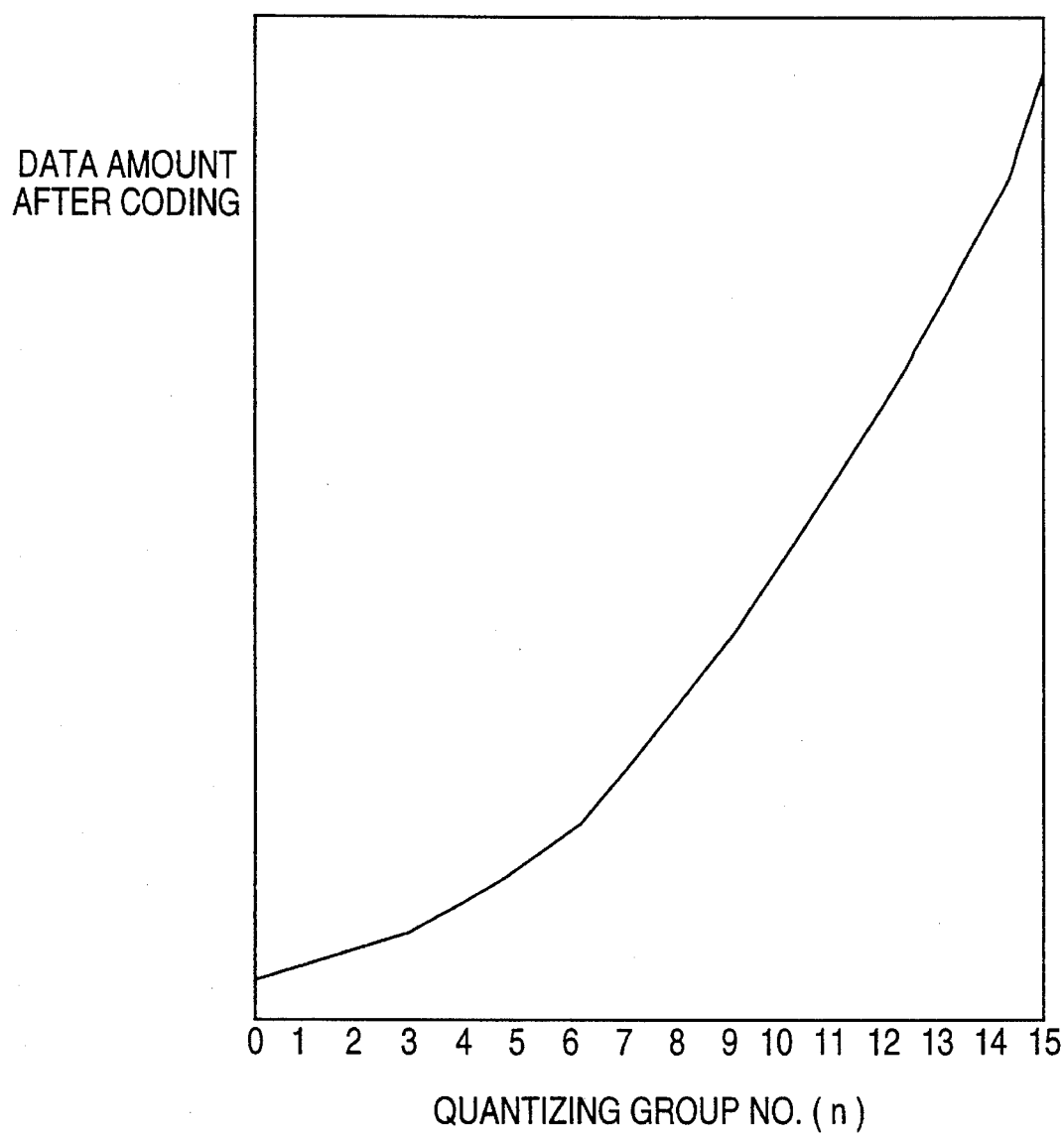
FIG. 7 is an explanatory diagram of a data amount after coding of the invention.

The table of quantizing widths in FIG. 6 also possesses the data amount characteristic as shown in FIG. 7. Therefore, in the table in FIG. 6, when the quantizing group number is large, the difference is great in the data amount after coding in every set by block classification, but when the quantizing group number is small, the difference is small in the data amount after coding in every set by block classification. That is, when the compression rate is high, the difference due to block classification is smaller. Hence, when the compression rate is high, the phenomenon of block distortion formed due to concentration of distortion in a specific block can be prevented.

Figure 8:
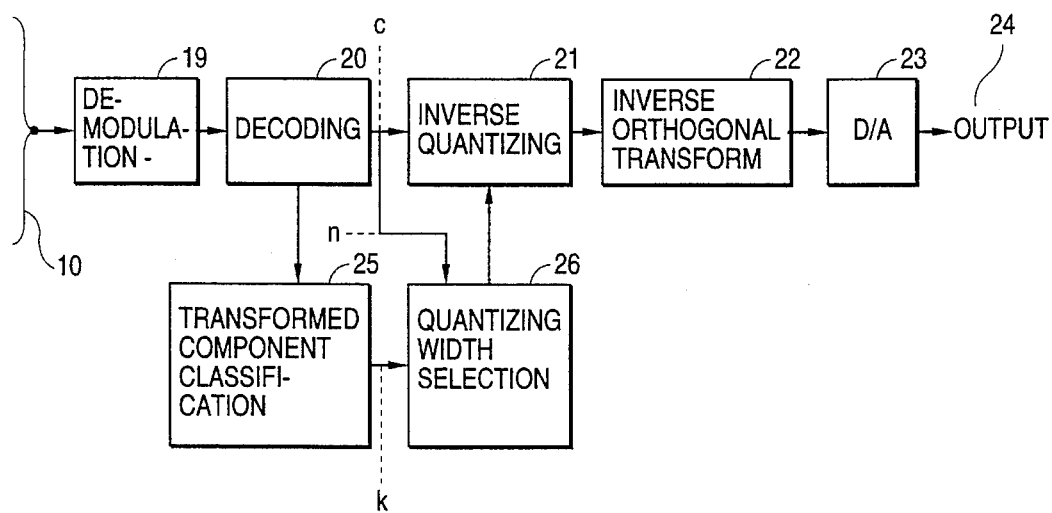
FIG. 8 is a block diagram of an embodiment of a reproducing apparatus of the invention.

An embodiment of a reproducing apparatus of the invention is described now by reference to FIG. 8. In FIG. 8, numeral 100 denotes a magnetic tape recorded by the bit rate reduction apparatus of the invention, 19 is a demodulator, 20 is a decoder, 21 is an inverse quantizer, 22 is an inverse orthogonal transformer, 23 is a D/A converter, 24 is an output part, 25 is a transformed component classifying part, and 26 is a quantizing width selector.

The information reproduced from the magnetic tape 10 is converted into digital signals by the demodulator 19 and fed into the decoder 20. In the decoder 20, the quantized value q is decoded from the variable length code word, and the quantizing group number n selected at the time of coding is detected.

In the transformed component classifying part 25, by the same method as used in coding, the set number k of the transformed component is fed into the quantizing width selector 26. In the quantizing width selector 26, the quantizing group number n fed from the decoder 20 and the quantizing width selected by the classification number k of the transformed component are entered in the inverse quantizer 21. In the inverse quantizer 21, the quantized value q is inversely quantized by the quantizing width entered from the quantizing width selector 26, and the transformed component c is decoded.

In the inverse orthogonal transformer 22, the decoded transformed component c is inversely transformed, and converted into analog information in the D/A converter 23, and is produced from the output part 24. In this way, the information recorded in the invention can be reproduced satisfactorily.

Figure 9:
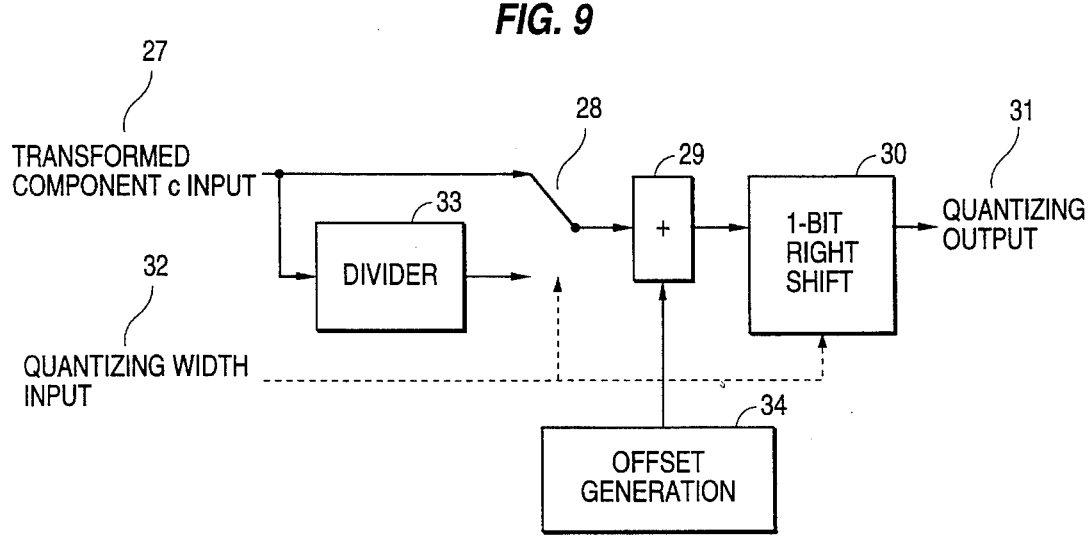
FIG. 9 is a block diagram of an embodiment of a quantizing part of the invention.

An embodiment of quantization of the invention is explained by reference to FIG. 9. FIG. 9 is a practical example of the quantizer shown in FIG. 1 or FIG. 4, and the quantizing width is $2^i$ or $2^{(i+\frac{1}{2})}$ (i being an integer not less than 0). In FIG. 8, numeral 27 is a transformed component c input part, 28 is a switch, 29 is an adder, 30 is an i-bit right shift part, 31 is a quantizing output part, 32 is a quantizing width input part, 33 is a divider, and 34 is an offset generator.

The transformed component entering from the transformed component c input part 27 in FIG. 9 is multiplied by $1/\sqrt{2}$ times in the divider 33. In the switch 28, when the quantizing width coming from the quantizing width input part 32 is $2^i$, the transformed component fed through the divider 33 is directly put out, and when the quantizing width is $2^{(i+\frac{1}{2})}$, the transformed component multiplied by $1/\sqrt{2}$ times coming in from the divider 33 is put out. The signal sent out from the switch 28 is combined with the offset value entering from the offset input part 34 in the adder 29, and is fed into the i-bit right shift part 30. In the i-bit shift part 30, the input signal is shifted i bits to the right and multiplied by $\frac{1}{2^i}$ times, and is produced as quantized value q from the quantizing output part 31.

In this constitution, all quantizing widths are composed of the power of 2 or the product of the power of 2 and $\sqrt{2}$. When executing the quantization in this quantizing width, the portion of the power of 2 of the quantizing width may be realized by binary bit shift. The portion of $\sqrt{2}$ is realized by $\{(45 \times c + 32)/64\}$ for the input c when quantizing, or by $\{(45 \times b + 16)/32\}$ for input b when inversely quantizing. Therefore, in actual quantizing or inverse quantizing, the quantizer may be easily realized by series execution of the processing for the power of 2 and processing for $\sqrt{2}$, so that the circuit scale can be saved significantly.

In the constitution as shown in FIG. 9, if there are many types of quantizing widths, the quantizer may be realized by a simple circuit. This constitution may be applied also to other quantizing width than $2^{(i+½)}$, by varying the divisor of the divider 33 in FIG. 9.

Figure 10:
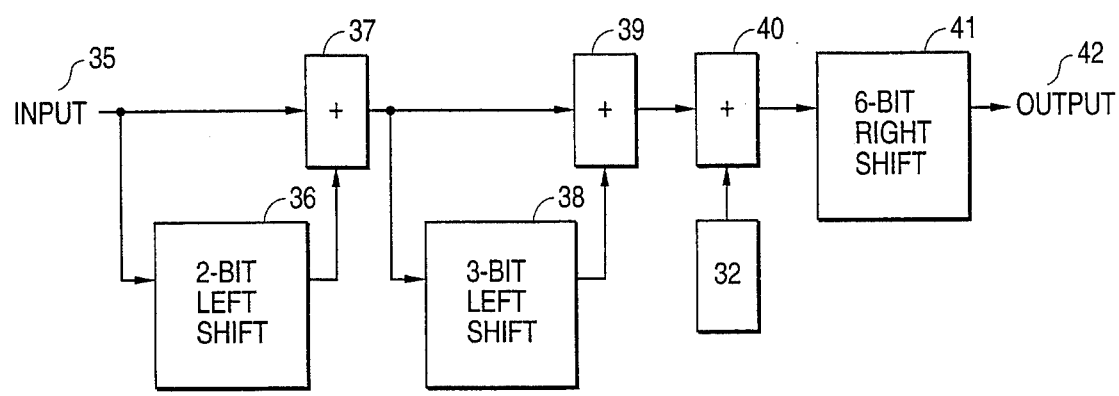
FIG. 10 is a block diagram of an embodiment of a $\sqrt{2}$ dividing part of the invention.

FIG. 10 is a practical example of a $\sqrt{2}$ divider 33 in FIG. 9. In FIG. 10, numeral 35 is an input part, 36 is a 2-bit left shift part, 37 is an adder, 38 is a 3-bit left shift part, 39 is an adder, 40 is an adder, 41 is a 6-bit right shift part, and 42 is an output part.

The transformed component entered from the input part 35 in FIG. 10 is shifted 2 bits to the left by the 2-bit left shift part 36, and multiplied 4 times. In the adder 37, the transformed component entered from the input part 35, and the 4 times transformed component entered from the 2-bit left shift part 36 are added, and 5 times transformed component is produced. The 5 times transformed component delivered from the adder 37 is shifted 3 bits to the left by the 3-bit left shift part 38, and is further multiplied by 8 times (total 40 times). In the adder 39, the 5 times transformed component entered from the adder 37, and the 40 times transformed component entered from the 3-bit left shift part 38 are added, and 45 times transformed component is produced. The 45 times transformed component coming out from the adder 39 is added by 82 in the adder 40, and is fed into the 6-bit right shift part 41. In the 6-bit right shift part 41, the input signal is shifted 6 bits to the right and multiplied by 1/64 times, and put out to the output part 42. In this way, the $\sqrt{2}$ divider can be composed easily by the bit shift and the three adders.

Figure 11:
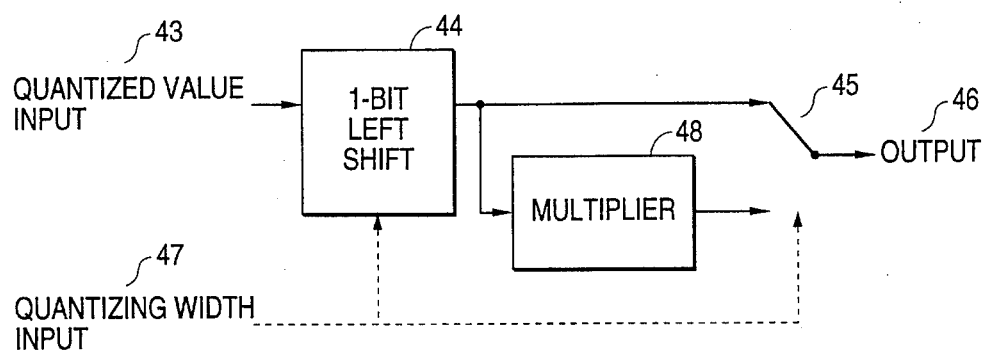
FIG. 11 is a block diagram of an embodiment of an inverse quantizing part of the invention.

Furthermore, when quantized by multiplying $1/\sqrt{2}$ times, $\sqrt{2}$ times should be required when quantizing inversely in reproduction. FIG. 11 shows a practical example of an inverse quantizer 21 when the quantizing width is 21 or $2^{(i+½)}$. In FIG. 11, numeral 43 is a quantized value input part, 44 is an i-bit left shift part, 45 is a switch, 46 is an output part, 47 is a quantized value input part, and 48 is a multiplier.

The quantized value q entered from the quantized value input part 43 in FIG. 11 is shifted 1 bits to the left by the i-bit left shift part 44 according to the quantizing width entered from the quantizing width input part 47, and multiplied by $2^i$ times. The $2^i$ times quantized value q is multiplied by 2 times by the multiplier 48. In the switch 45, when the quantizing width is $2^i$ the signal entered from the i-bit left shift part 44 is directly sent out to the output part 46, and when the quantizing width is $2^{(i+½)}$, the signal entered from the multiplier 48 is sent out to the output part 46. In this constitution, the inverse quantizer used in reproduction can be realized in a simple circuit.

Figure 12:
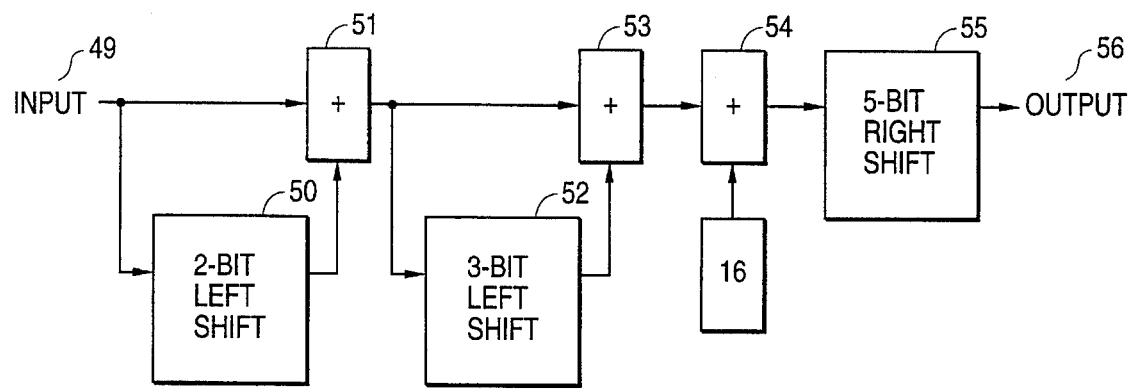
FIG. 12 is a block diagram of an embodiment of a $\sqrt{2}$ multiplying part of the invention.

FIG. 12 is a practical example of the multiplier 48 in FIG. 11. Numeral 49 in FIG. 12 is an input part, 50 is a 2-bit left shift part, 51 is an adder, 52 is a three-bit left shift part, 53 is an adder, 54 is an adder, 55 is a 5-bit right shift part, and 56 is an output part.

The signal entered from the input part 49 in FIG. 12 is shifted 2 bits to the left by the 2-bit left shift part 50 and multiplied 4 times. In the adder 51, the signal entered from the input part 49 and the signal multiplied 4 times which is entered from the 2-bit left shift part 50 are added, and a 5 times signal is produced. The 5 times signal sent out from the adder 51 is shifted 3 bits to the left in the 3-bit left shift part 52, and is further multiplied 8 times (total 40 times). In the adder 53, the 5 times signal entered from the adder 51, and the 40 times signal entered from the 3-bit left shift part 52 are added, and a 45 times signal is produced. The 45 times signal sent out from the adder 53 is further added by 16 in the adder 54, and is fed into the 5-bit right shift part 55. In the 5-bit right shift part 55, the input signal is shifted 5 bits to the right and multiplied by 1/32 times, and is produced to the output part 56. In this way, the $\sqrt{2}$ times can be composed easily by the bit shift and three adders. Also, as clear from FIG. 10 and FIG. 12, since the $\sqrt{2}$ division and $\sqrt{2}$ multiplication circuits are almost Identical in constitution, it is possible to realize by one circuit.

It is further possible to exchange the order of the 2-bit left shift part (4 times part) and 3-bit left shift part (8 times part) of $\sqrt{2}$ division and $\sqrt{2}$ multiplication. The $\sqrt{2}$ multiplication or $\sqrt{2}$ division of the invention may be also realized by a larger circuit scale of higher precision.

Figures 13, 14:
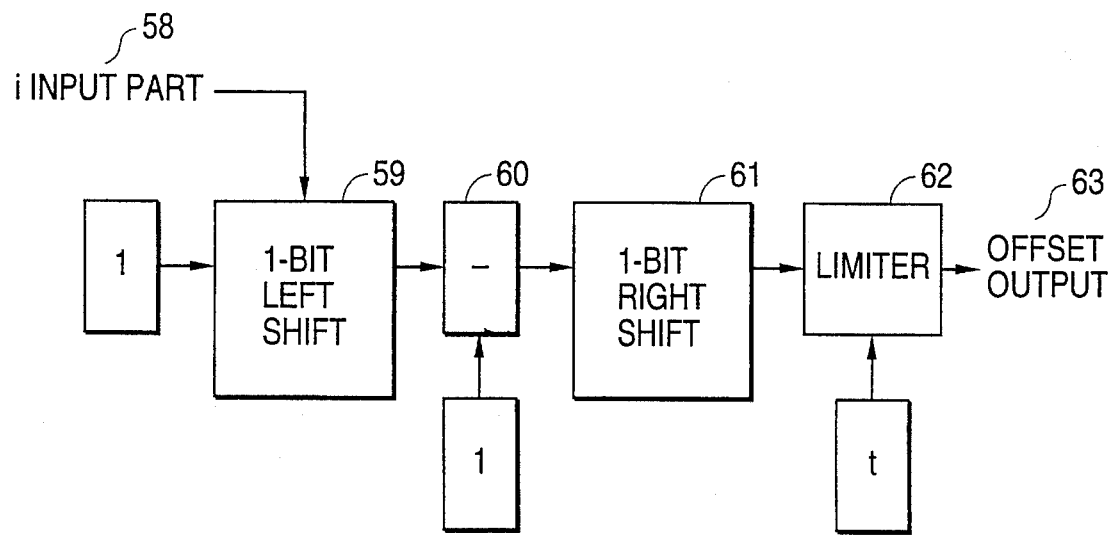
FIG. 13 is a block diagram of an embodiment of an offset generating part of the invention.
FIG. 14 is a table of offset values of the invention.

Referring now to FIG. 13, an embodiment of offset generator 34 of the quantizer is explained. FIG. 13 is an embodiment of generating method of offset value to be added before execution of i-bit right shift in the quantizer in FIG. 9. In FIG. 13, numeral 58 denotes an i input part, 59 is an i-bit left shift part, 60 is an subtractor, 61 is a 1-bit right shift part, 62 is a limiting part, and 63 is an offset value output part.

From the i input part 58 in FIG. 13, the value of i when shifted i bits to the right in the quantizer is entered in the i-bit left shift part 59. In the i-bit left shift part 59, the value "1" is shifted I bits to the left, and $2^i$ is obtained. The value of $2^i$ obtained in the i-bit left shift part 59 is subtracted by 1 in the subtractor 60, and is fed into the 1-bit right shift part 61. In the 1-bit right shift part 61, the input signal is shifted 1 bit to the right and multiplied by ½ times. At this point, the maximum integer not exceeding $(2^i-1)/2$ is produced from the i-bit right shift part 61. In the limiting part 62, the input $(2^i-1)/2$ entered from the 1-bit right shift part 61 is compared wlth a certain value t, and If not larger than t, $(2^i-1)/2$ is sent as offset value to the offset value output part 63, and if greater than t, t is sent out to the offset output part 63 as the offset value.

By determining the offset value in such constitution, it is possible to reduce the operation error due to i-bit right shift in the quantizer. In the invention, moreover, the offset value is limited to a certain size t. Hence, the offset value when i is large (when the quantizing width is large) is limited. When the quantizing width is large, the compression rate tends to be higher, and therefore the transmission data amount is desired to be as small as possible. By decreasing the offset value when the quantizing width is large, the data amount after coding can be decreased, and the compression rate may be lowered consequently. It enables to improve the Image quality deterioration when the information quantity of the input video signal is large. FIG. 14 shows a practical example of offset value when the value of t is 2. As in the table in FIG. 14, the value of i and the offset value are expressed in a simple relation, and therefore It is possible to realize also in other constitution than the embodiment in FIG. 13.

Next is explained quantizing or inverse quantizing by using the product of 3 or 5 or ⅓ or ⅕ and the power of 2 as the quantizing width of the invention.

Figure 15:
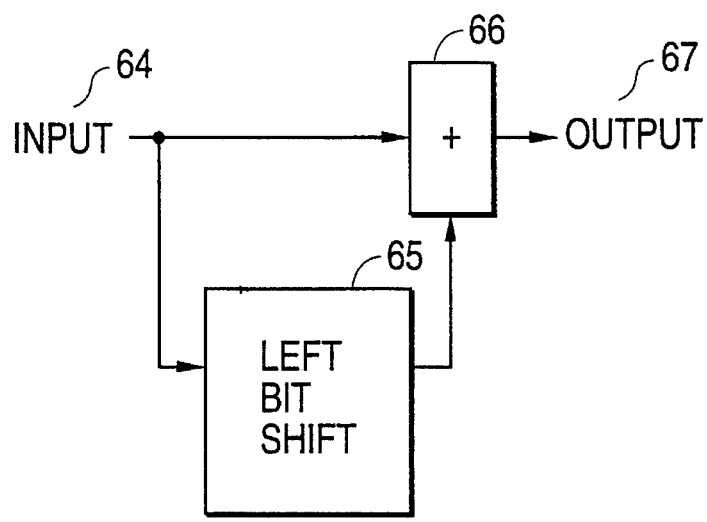
FIG. 15 is a block diagram of an embodiment of a method of execution of 3 times or 5 times of the invention.

The quantizer of which quantizing width is a multiple of ⅓ or ⅕, or the inverse quantizer of which quantizing width is a multiple of 3 or 5 requires a circuit for multiplying the input signal by 3 times or 5 times. FIG. 15 shows an embodiment of the constitution for multiplying the input signal by 3 times or 5 times.

In FIG. 15, numeral 64 is an input part, 65 is a left bit shift part, 66 is an adder, and 67 is an output part. The signal entered from the input part 64 is shifted in bits by the left bit shift part 65, and is entered in the adder 66. In the left bit shift part 65, when multiplying by 3 times, 1 bit is shifted to the left (2 times), or when multiplying by 5 times, 2 bits are shifted to the left (4 times). The signal coming out from the left bit shift part 65 is added with the input signal in the adder 66, and is delivered to the output part 67. As a result, the input signal multiplied by 3 times or 5 times can be easily generated.

Figure 16:
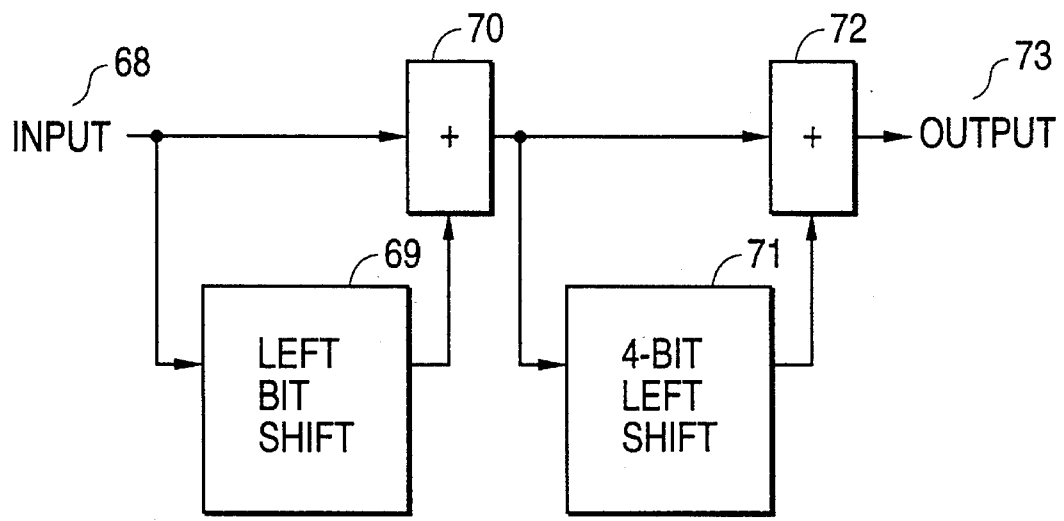
FIG. 16 is a block diagram of an embodiment of a method of execution of ⅓ times or ⅕ times of the invention.

On the other hand, the quantizer of which quantizing width is a multiple of 3 or 5, or the inverse quantizer of which quantizing width is a multiple of $1/3$ or $1/5$ requires a circuit for multiplying the input signal by $1/3$ times or $1/5$ times. $1/5$ can be approximated by $5 \times 17/258$, and $1/3$, by $3 \times 17/256$. Therefore, to realize $1/3$ times or $1/5$ times, a circuit realizing 5×17 times or 3×17 times is required. FIG. 16 is an embodiment for composing an input signal of 5×17 times or 3×17 times.

In FIG. 16, numeral 68 is an input part, 69 is a left bit shift part, 70 is an adder, 71 is a 4-bit left shift part, 72 is an adder, and 73 is an output part. The signal entered from the input part 68 is shifted in bit by the left bit shift part 69, and is entered in the adder 70. In the left bit shift part 69, when multiplying by 3×17 times, 1 bit is shifted to the left (2 times), and when multiplying by 5×17 times, 2 bits are shifted to the left (4 times). The signal sent out from the left bit shift part 69 is added with the input signal in the adder 70, and is fed into the 4-bit shift part 71. In the 4-bit left shift part 71, the output of the adder 70 is shifted 4 bits to the left (16 times) and sent out to the adder 72. The signal leaving the 4-bit left shift part 71 is added with the output of the adder 70 in the adder 72, and is sent out to the output part 73. As a result, the input signal multiplied by 5×17 times or 3×17 times can be easily generated.

Figure 17:
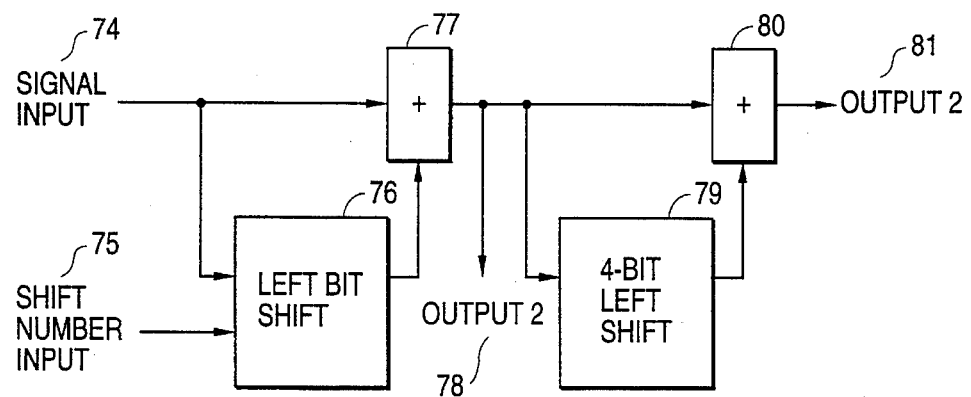
FIG. 17 is a block diagram of an embodiment of a method of execution of 3 times or 5 times or ⅓ times or ⅕ times of the invention.

The left bit shift part 65 and adder 66 in the embodiment in FIG. 15 are same as the left bit shift part 69 and adder 70 in the embodiment in FIG. 16. FIG. 17 shows an embodiment capable of executing all multiplications of 3 or 5 or 3×17 or 5×17.

In FIG. 17, numeral 74 is a signal input part, 75 is a shift number input part, 76 is a left bit shift part, 77 is an adder, 78 is a first output part, 79 is a 4-bit left shift part, 80 is an adder, and 81 is a second output part. The signal entered from the signal input part 74 is shifted in bits by the left bit shift part 76 according to the shift number entered from the shift number input part 75, and is fed into the adder 77. From the shift number input part 75, 1 is entered when multiplying 3 times or 3×17 times, or 2 is when multiplying by 5 times or 5×17 times. The signal sent out from the left bit shift part 76 is added with the input signal in the adder 77, and is fed into the first output part 78 and 4-bit shift part 79. As a result, the input signal multiplied by 3 times or 5 times is sent out from the first output part. In the 4-bit left shift part 79, the output of the adder 77 is shifted 4 bits to the left (16 times) and put out to the adder 80. The signal coming out from the 4-bit left shift part 79 is added with the output of the adder 77 in the adder 80, and is sent out to the second output part 81. As a result, the input signal multiplied by 5×17 times or 3×17 times is sent out from the second output part. In this way, by using the circuit in FIG. 17, the quantizer and inverse quantizer using the product of 3 or 5 or $1/3$ or $1/5$ and the power of 2 can be easily generated. Accordingly, the quantization or data quantity control of high precision can be easily realized. Besides, the bit shift part explained herein can be realized also by a mere selector, so that a very simple circuit may be realized.

Finally, the invention may be applied also to the bit rate reduction other than orthogonal transform, and its practical effects are outstanding.

What is claimed is:

1. A bit rate reduction apparatus comprising:

block forming means for dividing input samples of a video signal into blocks, wherein each of said blocks is composed of a specific number of the input samples;

transforming means for transforming the input samples in each of said blocks to obtain transformed components in each of said blocks;

transformed component classifying means for classifying the transformed components in each of said blocks into k sets of classes, where k is an integer larger than 1, according to a visual importance of each of the transformed components and for outputting a classification signal indicating a class of each of said transformed components;

quantizing width selecting means having m kinds of quantizing widths where m is an integer larger than 1, which are assigned to n quantizing groups, where n is an integer larger than 1, each of said n quantizing groups being composed of k sets of quantizing widths assigned to correspond to said k sets of classes such that a one of said quantizing widths assigned to a class of smaller visual importance becomes relatively larger than a one of said quantizing widths assigned to a class of larger visual importance, said n quantizing groups being arranged in an order having such a general tendency that the assigned quantizing widths increase and that a difference between the quantizing width assigned to the class of smaller visual importance and the quantizing width assigned to the class of larger visual importance increases, said quantizing width selecting means selecting one of said n quantizing groups and being responsive to said classification signal for selecting one of said quantizing widths in said k sets of quantizing widths in the selected one of said n quantizing groups;

quantizing means for quantizing each of the transformed components according to a quantizing width selected by the quantizing width selecting means to obtain a quantized value; and encoding means for encoding the quantized value to obtain a coded data.

2. A bit rate reduction apparatus comprising:

block forming means for dividing input samples of a video signal into blocks, wherein each of said blocks is composed of a specific number of the input samples;

transforming means for transforming the input samples in each of said blocks to obtain transformed components in each of said blocks;

block classifying means for classifying the blocks of transformed components into j sets of classes, where j is an integer larger than 1, according to a sum of absolute values of the transformed components in each of said blocks and for outputting a block classification signal indicating a class of each of said blocks;

transformed component classifying means for classifying the transformed components in each of said blocks into k sets of classes, where k is an integer larger than 1, and for outputting a transformed component classification signal indicating a class of each of said transformed components;

quantizing width selecting means having m kinds of quantizing widths, where m is an integer larger than 1, which are assigned to n quantizing groups, where n is an integer larger than 1, each of said n quantizing groups being composed of k sets of quantizing widths assigned to correspond to said k sets of classes such that a one of said quantizing widths assigned to a class of smaller visual importance becomes relatively larger than a one of said quantizing widths assigned to a class of larger visual importance, said n quantizing groups being arranged in an order having such a general tendency that the assigned quantizing widths increase and that a difference between the quantizing width assigned to the class of smaller visual importance and the quantizing width assigned to the class of larger visual importance increases, said quantizing width selecting means selecting one of said n quantizing groups and being responsive to said block classification signal and said transformed component classification signal for selecting one of said quantizing widths in said k sets of quantizing widths in the selected one of said n quantizing groups;

quantizing means for quantizing each of the transformed components according to a quantizing width selected by the quantizing width selecting means to obtain a quantized value; and encoding means for encoding the quantized value to obtain a coded data.

3. A bit rate reduction apparatus comprising:

block forming means for dividing input samples of a video signal into blocks, wherein each of said blocks is composed of a specific number of the input samples;

transforming means for transforming the input samples in each of said blocks to obtain transformed components in each of said blocks;

transformed component classifying means for classifying the transformed components in each of said blocks into k sets of classes, where k is an integer larger than 1, and for outputting a classification signal indicating a class of each of said transformed components;

data amount estimating means for estimating a data amount of bit rate reduction coded data and outputting a data amount control signal indicating an estimated data amount;

quantizing width selecting means having m kinds of quantizing widths, where m is an integer larger than 1, which are assigned to n quantizing groups, where n is an integer larger than 1, each of said n quantizing groups being composed of k sets of quantizing widths assigned to correspond to said k sets of classes such that a one of said quantizing widths assigned to a class of smaller visual importance becomes relatively larger than a one of said quantizing widths assigned to a class of larger visual importance, said n quantizing groups being arranged in an order having such a general tendency that the assigned quantizing widths increase and that a difference between the quantizing width assigned to a class of smaller visual importance and the quantizing width assigned to the class of larger visual importance increases, said quantizing width selecting means being responsive to said data amount control signal for selecting one of said n quantizing groups and being responsive to said block classification signal for selecting one of said quantizing widths in said k sets of quantizing widths in the selected one of said n quantizing groups;

quantizing means for quantizing each of the transformed components according to a quantizing width selected by the quantizing width selecting means to obtain a quantized value; and encoding means for encoding the quantized value to obtain a coded data.

4. A bit rate reduction apparatus comprising:

block forming means for dividing input samples of a video signal into blocks, wherein each of said blocks is composed of a specific number of the input samples;

transforming means for transforming the input samples in each of said blocks to obtain transformed components;

quantizing width selecting means having m kinds of quantizing widths, where m is an integer larger than 1, including a power of 2 or a product of a power of 2 and one of 3, 5, ⅓ and ⅕ for selecting one of the quantizing widths;

quantizing means for quantizing each of the transformed components by using the selected quantized width to obtain a quantized value; and encoding means for encoding the quantizing value to obtain a bit rate reduction coded data;

wherein the quantizing means includes multiplying means for multiplying an input signal inputted thereby by 3 or 5, and wherein the multiplying means comprises a bit-shifting means for bit-shifting the input signal, and an adding means for adding an output of the bit-shifting means and the input signal.

5. A bit rate reduction apparatus comprising:

block forming means for dividing input samples of a video signal into blocks, wherein each of said blocks is composed of a specific number of the input samples;

transforming means for transforming the input samples in each of said blocks to obtain transformed components;

quantizing width selecting means having m kinds of quantizing widths, where m is an integer larger than 1, including a power of 2 or a product of a power of 2 and one of 3, 5, ⅓ and ⅕ for selecting one of the quantizing widths;

quantizing means for quantizing each of the transformed components by using the selected quantized width to obtain a quantized value; and encoding means for encoding the quantizing value to obtain a bit rate reduction coded data;

wherein the quantizing means includes multiplying means for performing a multiplication of an input signal inputted thereto by ⅓ or ⅕, and wherein the multiplying means comprises a first bit-shifting means for bit-shifting the input signal, a first adding means for adding output of the first bit-shifting means and the input signal, a second bit-shifting means for bit-shifting an output of the first adding means, and a second adding means for adding an output of the second bit-shifting means and the output of the first adding means.

6. A bit rate reduction apparatus comprising:

block forming means for dividing input samples of a video signal into blocks, wherein each of said blocks is composed of a specific number of the input samples;

transforming means for transforming the input samples in each of said blocks to obtain transformed components;

quantizing width selecting means having m kinds of quantizing widths, where m is an integer larger than 1, including a power of 2 or a product of a power of 2 and one of 3, 5, ⅓ and ⅕ for selecting one of the quantizing widths;

quantizing means for quantizing each of the transformed components by using the selected quantized width to obtain a quantized value; and encoding means for encoding the quantizing value to obtain a bit rate reduction coded data;

wherein the quantizing means includes first multiplying means for performing a multiplication of an input signal inputted to the quantizing means by 3 or 5, and second multiplying means for performing a multiplication of the input signal by ⅓ or ⅕, wherein the first multiplying means comprises, a first bit-shifting means for bit-shifting the input signal, and a first adding means for adding an output of the first bit-shifting means and the input signal, and wherein the second multiplying means comprises a second bit-shifting means for bit-shifting an output of the first adding means, and a second adding means for adding an output of the second bit-shifting means and the output of the first adding means.

7. A decoding apparatus for decoding bit rate reduction coded data produced by dividing samples of a video signal into blocks, wherein each of said blocks is composed of a specific number of the samples, transforming the samples in each of said blocks to transformed components, quantizing the transformed components to quantized values by using quantizing widths, wherein each of the quantizing widths is expressed as $2^i$ or $2^{(i+½)}$, where i is an integer including 0, and encoding the quantized values, said decoding apparatus comprising:

decoding means for decoding the bit rate reduction coded data to obtain reproduced quantized values;

inverse quantizing means for performing inverse quantizing of the reproduced quantized values to obtain reproduced transformed components, the inverse quantizing means inversely shifting each of the reproduced quantized values by i bits when the quantizing width is $2^i$, and inversely shifting each of the reproduced quantized values by i bits and executing a process of $\{(Q \times 45 + 16)/32\}$ when the quantizing width is $2^{(i+½)}$, where Q denotes a value of the bit-shifted transformed component;

wherein the inverse quantizing means includes multiplying means for performing a multiplication of Q×45, and wherein the multiplying means comprises a first bit-shifting means for bit-shifting an input signal inputted thereto, a first adding means for adding an output of the first bit-shifting means and the input signal, a second bit-shifting means for bit-shifting an output of the first adding means, and a second adding means for adding an output of the second bit-shifting means and the output of the first adding means.

8. A decoding apparatus for decoding bit rate reduction coded data produced by dividing samples of a video signal into blocks, wherein each of said block is composed of a specific number of the samples, transforming the samples in each of said block to transformed components, quantizing the transformed components to quantized values by using quantizing widths, wherein each of the quantizing widths is expressed as $2^i$ or $2^{(i+½)}$, where i is an integer including 0 and encoding the quantized values, said decoding apparatus comprising:

decoding means for decoding the bit rate reduction coded data to obtain reproduced quantized values;

inverse quantizing means for performing inverse quantizing of the reproduced quantized values to obtain reproduced transformed components, the inverse quantizing means inversely shifting each of the reproduced quantized values by i bits when the quantizing width is $2^i$, and inversely shifting each of the reproduced quantized values by i bits and executing a process of $\{(Q \times 45 + 16)/32\}$ when the quantizing width is $2^{(i+½)}$, where Q denotes a value of the bit-shifted transformed component;

wherein the inverse quantizing means includes multiplying means for multiplying an input signal inputted thereto by 3 or 5, and wherein the multiplying means comprises a bit-shifting means for bit-shifting the input signal, and an adding means for adding an output of the bit-shifting means and the input signal.

9. A decoding apparatus for decoding bit rate reduction coded data produced by dividing samples of a video signal into blocks, wherein each of said block is composed of a specific number of the samples, transforming the samples in each of said block to transformed components, quantizing the transformed components to quantized values by using quantizing widths, wherein each of the quantizing widths is expressed as $2^i$ or $2^{(i+½)}$, where i is an integer including 0, and encoding the quantized values, said decoding apparatus comprising:

decoding means for decoding the bit rate reduction coded data to obtain reproduced quantized values;

inverse quantizing means for performing inverse quantizing of the reproduced quantized values to obtain reproduced transformed components., the inverse quantizing means inversely shifting each of the reproduced quantized values by i bits when the quantizing width is $2^i$ and inversely shifting each of the reproduced quantized values by i bits and executing a process of $\{(Q \times 45 + 16)/32\}$ when the quantizing width is $2^{(i+½)}$, where Q denotes a value of the bit-shifted transformed component;

wherein the inverse quantizing means includes multiplying means for performing a multiplication of an input signal inputted thereto by ⅓ or ⅕, and wherein the multiplying means comprises a first bit-shifting means for bit-shifting the input signal, a first adding means for adding an output of the first bit-shifting means and the input signal, a second bit-shifting means for bit-shifting an output of the first adding means, and a second adding means for adding an output of the second bit-shifting means and the output of the first adding means.

10. A decoding apparatus for decoding bit rate reduction coded data produced by dividing samples of a video signal into blocks, wherein each of said block is composed of a specific number of the samples, transforming the samples in each of said block to transformed components, quantizing the transformed components to quantized values by using quantizing widths, wherein each of the quantizing widths is expressed as $2^i$ or $2^{(i+½)}$, where i is an integer including 0, and encoding the quantized values, said decoding apparatus comprising:

decoding means for decoding the bit rate reduction coded data to obtain reproduced quantized values;

inverse quantizing means for performing inverse quantizing of the reproduced quantized values to obtain reproduced transformed components, the inverse quantizing means inversely shifting each of the reproduced quantized values by i bits when the quantizing width is $2^i$ and inversely shifting each of the reproduced quantized values by i bits and executing a process of $\{(Q \times 45 + 16)/32\}$ when the quantizing width is $2^{(i+½)}$, where Q denotes a value of the bit-shifted transformed component;

wherein the quantizing means includes first multiplying means for performing a multiplication of an input signal inputted to the quantizing means by 3 or 5, and second multiplying means for performing a multiplication of the input signal by $\frac{1}{3}$ or $\frac{1}{5}$, wherein the first multiplying means comprises a first bit-shifting means for bit-shifting the input signal, and a first adding means for adding an output of the first bit-shifting means and the input signal, and wherein the second multiplying means comprises a second bit-shifting means for bit-shifting an output of the first adding means, and a second adding means for adding an output of the second bit-shifting means and the output of the first adding means.

* * * * *